US010240476B2

(12) United States Patent
Varney et al.

(10) Patent No.: US 10,240,476 B2
(45) Date of Patent: Mar. 26, 2019

(54) FULL HOOP BLADE TRACK WITH INTERSTAGE COOLING AIR

(71) Applicants: Rolls-Royce Corporation, Indianapolis, IN (US); Rolls-Royce North American Technologies, Inc., Indianapolis, IN (US)

(72) Inventors: Bruce E. Varney, Greenwood, IN (US); Jack D. Petty, Indianapolis, IN (US); Daniel K. Vetters, Indianapolis, IN (US); Eugene Clemens, Brownsburg, IN (US)

(73) Assignees: Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 491 days.

(21) Appl. No.: 15/000,661

(22) Filed: Jan. 19, 2016

(65) Prior Publication Data
US 2017/0204737 A1   Jul. 20, 2017

(51) Int. Cl.
*F01D 11/24*   (2006.01)
*F01D 25/24*   (2006.01)
*F01D 11/00*   (2006.01)

(52) U.S. Cl.
CPC .......... *F01D 11/24* (2013.01); *F01D 11/005* (2013.01); *F01D 25/246* (2013.01); *F05D 2300/6033* (2013.01); *Y02T 50/672* (2013.01)

(58) Field of Classification Search
None
See application file for complete search history.

(56) References Cited

U.S. PATENT DOCUMENTS

| | | | |
|---|---|---|---|
| 3,601,414 A | 8/1971 | Rao | |
| 4,087,199 A | 5/1978 | Hemsworth et al. | |
| 4,317,646 A * | 3/1982 | Steel | F01D 11/18 415/116 |
| 4,419,044 A * | 12/1983 | Barry | F01D 11/24 415/117 |
| 4,477,086 A | 10/1984 | Feder et al. | |

(Continued)

FOREIGN PATENT DOCUMENTS

| | | |
|---|---|---|
| DE | 102008044450 A1 | 2/2009 |
| EP | 1965030 A2 | 9/2008 |

(Continued)

OTHER PUBLICATIONS

Corman, Gregory S. and Luthra, Krishan L.; Melt Infiltrated Ceramic Composites (HIPERCOMP®) for Gas Turbine Engine Applications; DOE/CE/41000-3; May 1994-Sep. 2005; pp. 1-507.

(Continued)

*Primary Examiner* — Christopher Verdier
*Assistant Examiner* — Jason G Davis
(74) *Attorney, Agent, or Firm* — Barnes & Thornburg LLP

(57) ABSTRACT

A gas turbine engine includes a turbine having a plurality of vanes, a plurality of blades, a turbine shroud arranged around the vanes and blades, and a turbine case arranged around the turbine shroud. The turbine shroud is sized to block combustion products from passing over the blades without pushing the blades to rotate. The turbine shroud includes a runner arranged around the blades and a carrier arranged around the runner.

15 Claims, 10 Drawing Sheets

(56) References Cited

U.S. PATENT DOCUMENTS

| | | | |
|---|---|---|---|
| 4,646,810 A | 3/1987 | Lardellier | |
| 4,679,981 A | 7/1987 | Guibert et al. | |
| 4,863,345 A | 9/1989 | Thompson et al. | |
| 5,163,809 A | 11/1992 | Akgun et al. | |
| 5,738,490 A | 4/1998 | Pizzi | |
| 5,993,150 A * | 11/1999 | Liotta | F01D 11/10 415/115 |
| 6,142,731 A | 11/2000 | Dewis et al. | |
| 6,315,519 B1 | 11/2001 | Bagepalli et al. | |
| 6,517,313 B2 | 2/2003 | Rogers | |
| 6,726,448 B2 | 4/2004 | McGrath et al. | |
| 6,733,233 B2 | 5/2004 | Jasklowski et al. | |
| 6,758,386 B2 | 7/2004 | Marshall et al. | |
| 6,758,653 B2 | 7/2004 | Morrison | |
| 6,896,483 B2 | 5/2005 | Dierksmeier et al. | |
| 6,910,853 B2 | 6/2005 | Corman et al. | |
| 6,997,673 B2 * | 2/2006 | Morris | F01D 9/04 415/1 |
| 7,090,459 B2 | 8/2006 | Bhate et al. | |
| 7,195,452 B2 | 3/2007 | Allan et al. | |
| 7,217,089 B2 | 5/2007 | Durocher et al. | |
| 7,234,306 B2 | 6/2007 | Aumont et al. | |
| 7,374,396 B2 | 5/2008 | Martin et al. | |
| 7,435,049 B2 | 10/2008 | Ghasripoor et al. | |
| 7,641,442 B2 | 1/2010 | Denece et al. | |
| 7,665,960 B2 | 2/2010 | Shi et al. | |
| 7,771,160 B2 | 8/2010 | Shi et al. | |
| 7,914,256 B2 | 3/2011 | Xie et al. | |
| 7,988,395 B2 | 8/2011 | Steffier | |
| 8,047,773 B2 | 11/2011 | Bruce et al. | |
| 8,061,977 B2 | 11/2011 | Keller et al. | |
| 8,079,807 B2 | 12/2011 | Shapiro et al. | |
| 8,092,160 B2 | 1/2012 | Shi et al. | |
| 8,167,546 B2 | 5/2012 | Shi et al. | |
| 8,235,670 B2 | 8/2012 | Morrison et al. | |
| 8,257,029 B2 | 9/2012 | Habarou et al. | |
| 8,322,983 B2 | 12/2012 | Marini | |
| 8,328,505 B2 | 12/2012 | Shi et al. | |
| 8,496,431 B2 | 7/2013 | Habarou et al. | |
| 8,511,975 B2 | 8/2013 | Shi et al. | |
| 8,555,647 B2 | 10/2013 | Dimascio et al. | |
| 8,568,091 B2 | 10/2013 | McCaffrey | |
| 8,651,497 B2 | 2/2014 | Tholen et al. | |
| 8,684,689 B2 | 4/2014 | Guo et al. | |
| 8,739,547 B2 | 6/2014 | Jarmon et al. | |
| 8,740,552 B2 | 6/2014 | Marusko et al. | |
| 8,770,931 B2 | 7/2014 | Alvanos et al. | |
| 8,784,052 B2 | 7/2014 | Shi et al. | |
| 8,790,067 B2 | 7/2014 | McCaffrey et al. | |
| 8,801,372 B2 | 8/2014 | Shi et al. | |
| 8,814,173 B2 | 8/2014 | Motzkus et al. | |
| 8,834,106 B2 | 9/2014 | Luczak | |
| 8,926,270 B2 | 1/2015 | Hasting et al. | |
| 9,011,079 B2 | 4/2015 | Coign et al. | |
| 9,926,801 B2 * | 3/2018 | Uskert | F01D 11/24 |
| 2004/0047726 A1 | 3/2004 | Morrison | |
| 2008/0187435 A1 * | 8/2008 | Farah | F01D 9/04 415/115 |
| 2009/0208322 A1 | 8/2009 | McCaffrey | |
| 2010/0111678 A1 | 5/2010 | Habarou et al. | |
| 2010/0150703 A1 | 6/2010 | Gonzalez et al. | |
| 2010/0232941 A1 | 9/2010 | Smoke et al. | |
| 2011/0052384 A1 | 3/2011 | Shi et al. | |
| 2011/0057394 A1 | 3/2011 | Halling | |
| 2011/0150635 A1 | 6/2011 | Motzkus et al. | |
| 2011/0274538 A1 | 11/2011 | Shi et al. | |
| 2012/0070276 A1 | 3/2012 | Shi et al. | |
| 2012/0107107 A1 | 5/2012 | Chan et al. | |
| 2012/0156029 A1 | 6/2012 | Karafillis et al. | |
| 2012/0177488 A1 | 7/2012 | Corman | |
| 2012/0247124 A1 | 10/2012 | Shapiro et al. | |
| 2012/0263582 A1 | 10/2012 | Foster et al. | |
| 2012/0301269 A1 | 11/2012 | Alvanos et al. | |
| 2012/0301312 A1 | 11/2012 | Berczik et al. | |
| 2012/0301303 A1 | 12/2012 | Alvanos et al. | |
| 2012/0308367 A1 | 12/2012 | Luczak | |
| 2013/0008176 A1 | 1/2013 | Shi et al. | |
| 2013/0011248 A1 | 1/2013 | Croteau et al. | |
| 2013/0177384 A1 | 7/2013 | Coign et al. | |
| 2013/0177411 A1 | 7/2013 | Weber et al. | |
| 2014/0202168 A1 | 7/2014 | Shapiro et al. | |
| 2014/0260320 A1 | 9/2014 | Graves et al. | |
| 2014/0271144 A1 * | 9/2014 | Landwehr | F01D 11/08 415/173.1 |
| 2015/0044044 A1 | 2/2015 | Freeman et al. | |
| 2016/0123171 A1 | 5/2016 | Westphal et al. | |
| 2016/0177786 A1 | 6/2016 | Sippel et al. | |
| 2016/0208635 A1 | 7/2016 | Vetters et al. | |
| 2016/0222812 A1 | 8/2016 | Sippel et al. | |

FOREIGN PATENT DOCUMENTS

| | | |
|---|---|---|
| EP | 2589774 A1 | 5/2013 |
| EP | 2604805 A2 | 6/2013 |
| FR | 2580033 A1 | 10/1986 |
| FR | 2980235 B1 | 4/2015 |
| GB | 2235730 A | 3/1991 |
| GB | 2468768 A | 9/2010 |
| GB | 2480766 A | 11/2011 |
| JP | 09250304 A | 9/1997 |
| JP | 09264104 A | 10/1997 |
| WO | 2010058137 A1 | 5/2010 |
| WO | 2011157956 A1 | 12/2011 |
| WO | 2014120334 A1 | 8/2014 |
| WO | 2014143225 A1 | 9/2014 |
| WO | 2014163674 A1 | 10/2014 |

OTHER PUBLICATIONS

Blosser, Max L.; Thermal Stress in High Temperature Cylindrical Fasteners; NASA Technical Memorandum; May 1988; pp. 1-12.

Blosser, Max L. and McWithey, Robert R.; Theoretical Basis for Design of Thermal-Stress-Free Fasteners; NASA Technical Paper; Dec. 1983; pp. 1-26.

* cited by examiner

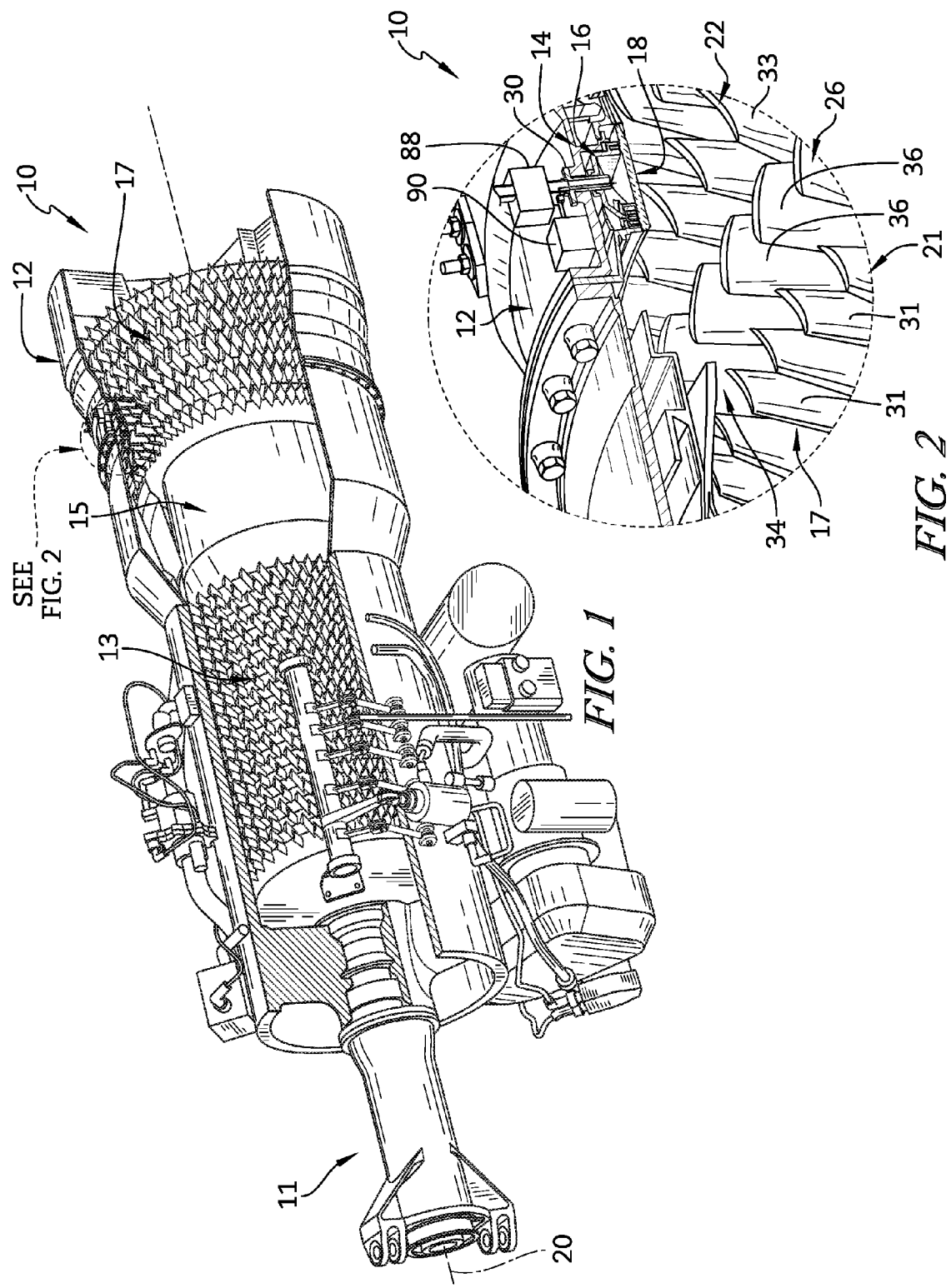

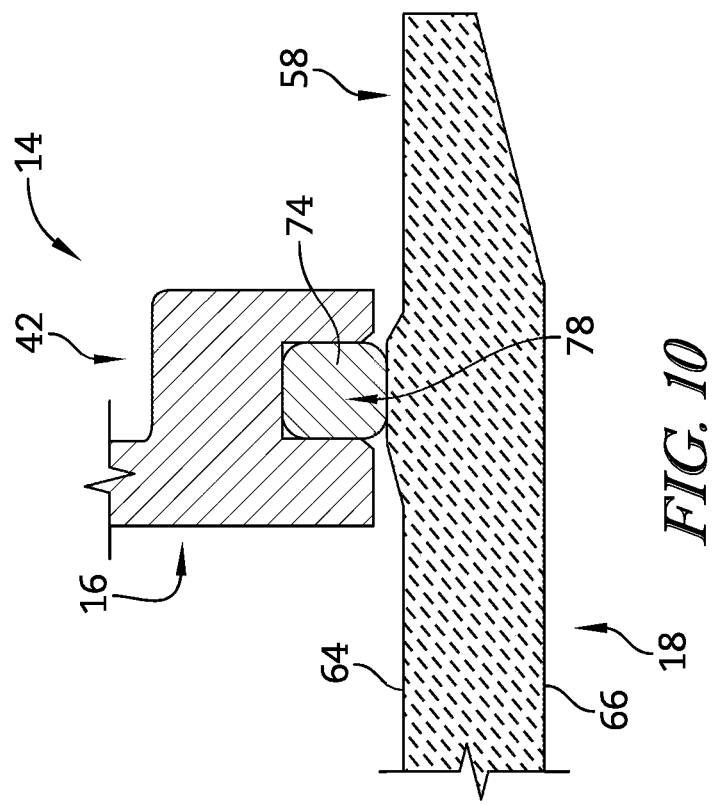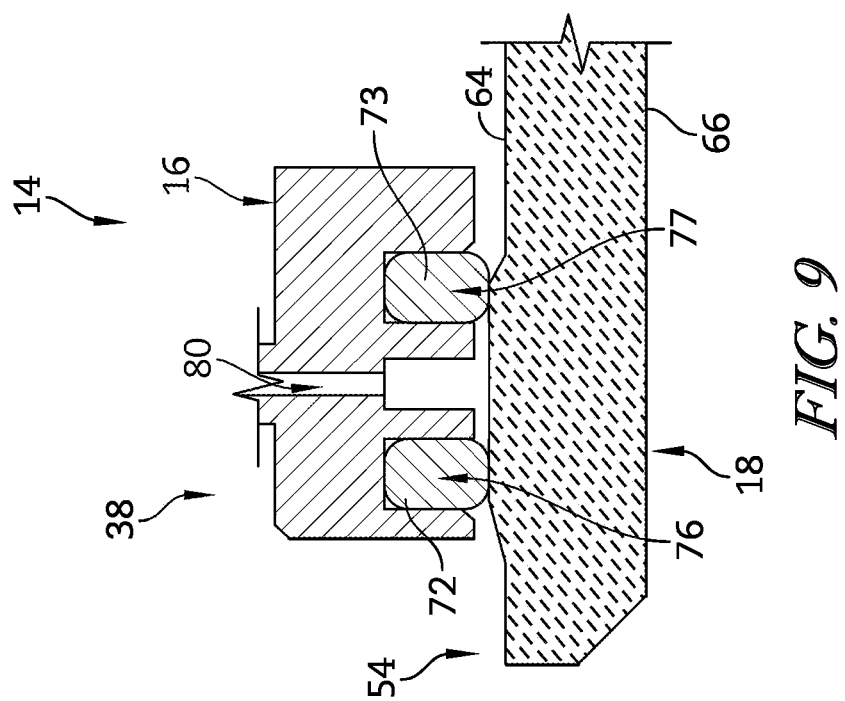

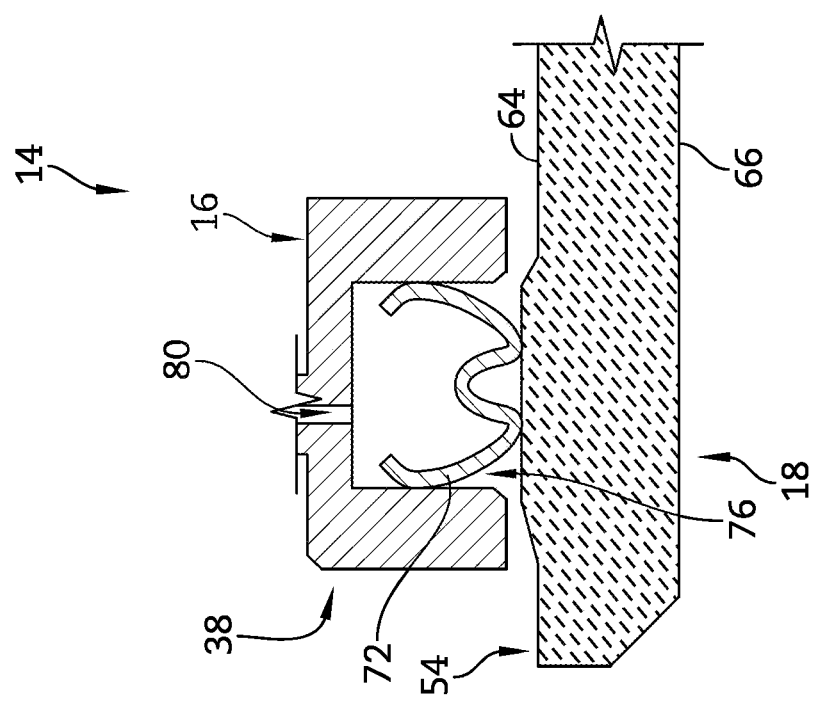

FULL HOOP BLADE TRACK WITH INTERSTAGE COOLING AIR

FIELD OF THE DISCLOSURE

The present disclosure relates generally to gas turbine engines, and more specifically to turbine shrouds used in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, a fan assembly. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and/or the turbine.

Some shrouds positioned in the turbine may be exposed to high temperatures from products of the combustion reaction in the combustor. Such shrouds sometimes include components made from materials that have different coefficients of thermal expansion; i.e. metallic, ceramics, and/or composites. Due to the differing coefficients of thermal expansion, the components of some turbine shrouds expand at different rates when exposed to combustion products. Integrating such components can present challenges for assembly and operation of turbine shrouds.

SUMMARY

Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, a shaft. Left-over products of the combustion are exhausted out of the turbine and may provide thrust in some applications.

In illustrative embodiments, the turbine includes a plurality of rotating blades and a turbine shroud arranged around the blades to block gas from passing over the blades without interacting with the blades. The turbine shroud defines an internal buffer chamber that receives cooling air to control a temperature of the turbine shroud.

In illustrative embodiments, the turbine includes a cooling system configured to direct pressurized cooling air into the buffer chamber to cool the turbine shroud. The cooling system illustratively includes at least one hollow insert pin extending through the turbine case and the turbine shroud into the buffer chamber to allow pressurized cooling air to pass through the turbine case and the turbine shroud into the buffer chamber.

In illustrative embodiments, the cooling system further includes an impingement plate positioned in the buffer chamber to separate the annular buffer chamber into an outer chamber and an inner chamber located radially between the outer chamber and the annular runner. The pressurized cooling air is conducted through the hollow insert pin into the outer chamber. The outer chamber is configured to uniformly distribute the air in the buffer chamber before the air is conducted into the inner chamber. The impingement plate illustratively includes a plurality of diffusion holes extending through the impingement plate and configured to direct the pressurized cooling air in the outer chamber into the inner chamber and toward a runner included in the turbine shroud.

These and other features of the present disclosure will become more apparent from the following description of the illustrative embodiments.

BRIEF DESCRIPTION OF THE DRAWINGS

FIG. 1 is a cut-away perspective view of a gas turbine engine including a turbine section, the turbine section including a rotating wheel assembly, a turbine shroud arranged around the rotating wheel assembly, and a turbine case arranged around the turbine shroud;

FIG. 2 is a detail view of FIG. 1 showing that the gas turbine engine includes a plurality of outer insert pins that extend through the turbine case into the turbine shroud to block rotation of the turbine shroud relative to the turbine case and that the turbine shroud includes a carrier and an annular runner positioned radially between the carrier and blades of the rotating wheel assembly to block combustion products from passing over the blades;

FIG. 9 is an enlarged cross-sectional view of the turbine shroud of FIGS. 7 and 8 showing piston ring seals positioned between the forward sections of the carrier and the annular runner;

FIG. 10 is an enlarged cross-sectional view of the turbine shroud of FIGS. 7 and 8 showing a piston ring seal positioned between the aft sections of the carrier and the annular runner;

FIG. 13 is an enlarged cross-sectional view of another embodiment of a turbine shroud for use in the gas turbine engine of FIG. 1 showing a W-shaped seal positioned between the forward sections of the carrier and the annular runner which may replace the piston ring seal arrangement of FIG. 9.

DETAILED DESCRIPTION OF THE DRAWINGS

Figure 3:
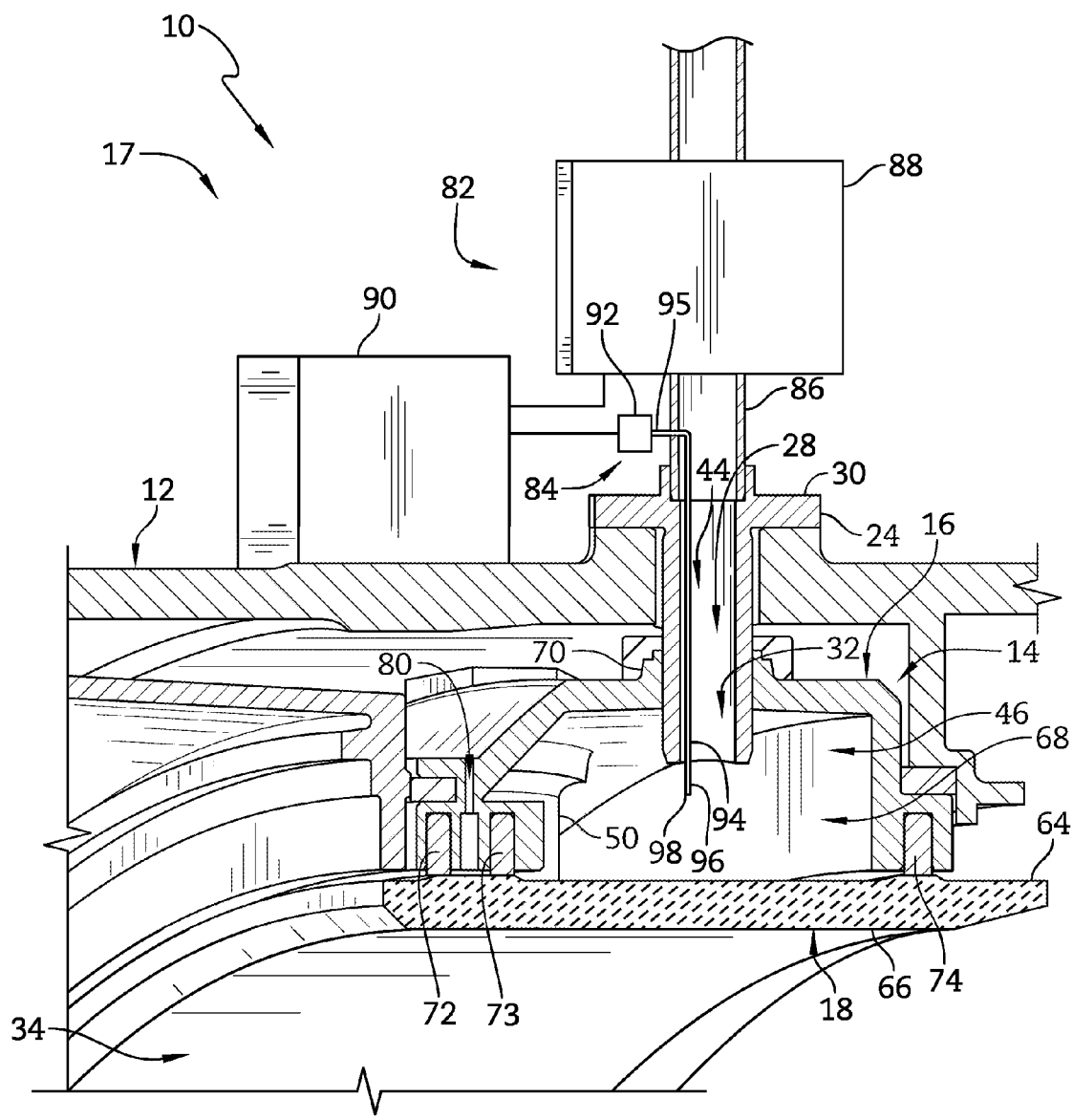
FIG. 3 is a partial perspective view of the gas turbine engine of FIG. 1 cut away to show (i) that the outer insert pins extend through the turbine case and the carrier included in the turbine shroud to block rotation of the turbine shroud relative to the turbine case and to provide centering of the carrier to the turbine case and suggesting that the outer insert pin is hollow to allow pressurized cooling air to pass through the turbine case and the carrier into a buffer chamber formed by the turbine shroud to cool the annular runner and (ii) that a health monitoring system of the gas turbine engine includes a sensor extending through the hollow outer insert pin to measure properties of the buffer chamber.

For the purposes of promoting an understanding of the principles of the disclosure, reference will now be made to a number of illustrative embodiments illustrated in the drawings and specific language will be used to describe the same.

Figure 4:
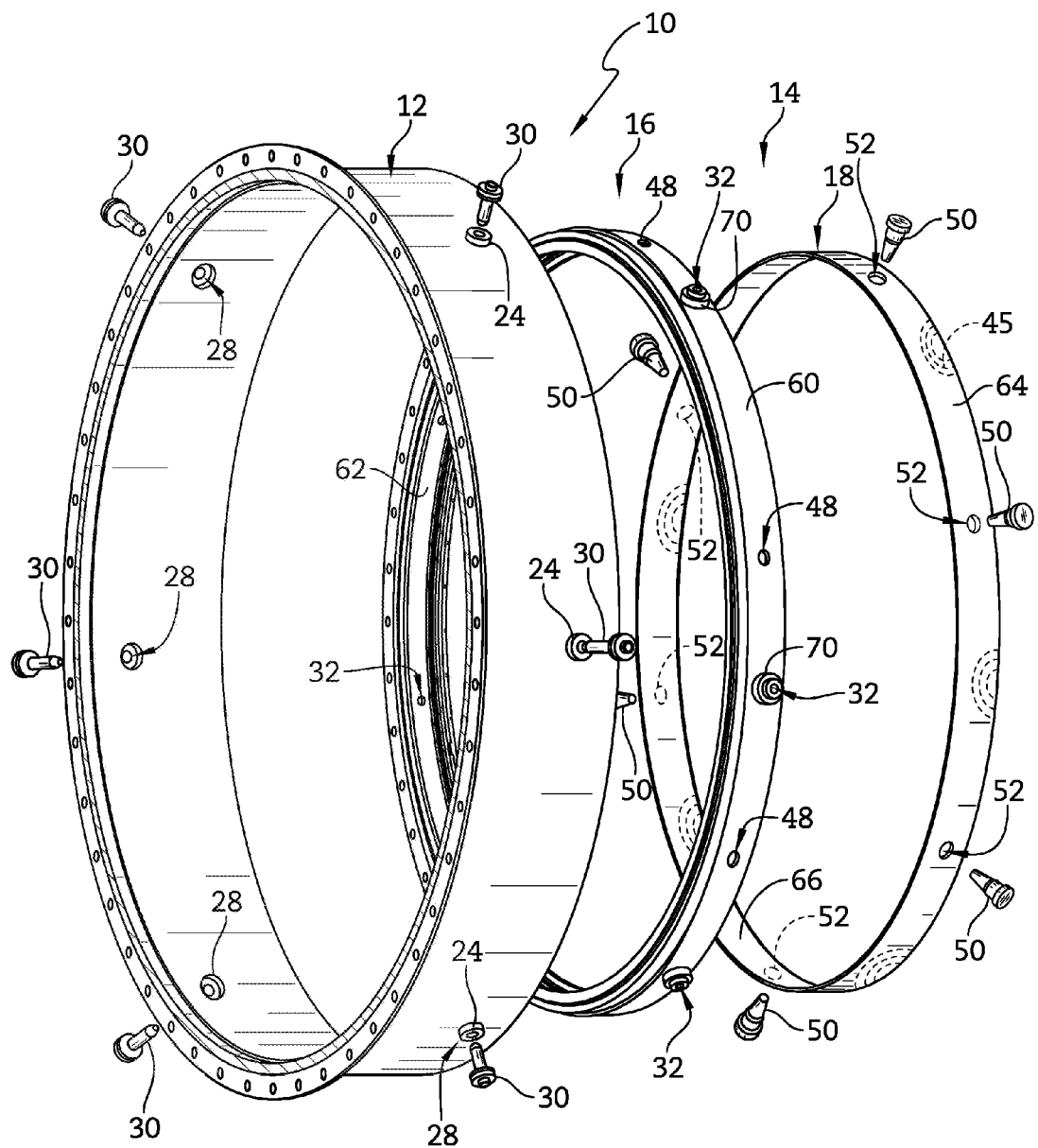
FIG. 4 is an exploded perspective view of certain components of the turbine section included in the gas turbine engine of FIGS. 1 and 2 showing that the turbine section includes the turbine case formed to include a plurality of outer keyways, the carrier formed to include a plurality of outer pin receivers and a plurality of inner keyways spaced apart from the outer pin receivers, the plurality of outer insert pins adapted to extend through the outer keyways of the turbine case and into the outer pin receivers of the carrier, the annular runner formed to include a plurality of inner pin receivers, and a plurality of inner insert pins adapted to extend through the inner keyways of the carrier into the annular runner.
Figure 7:
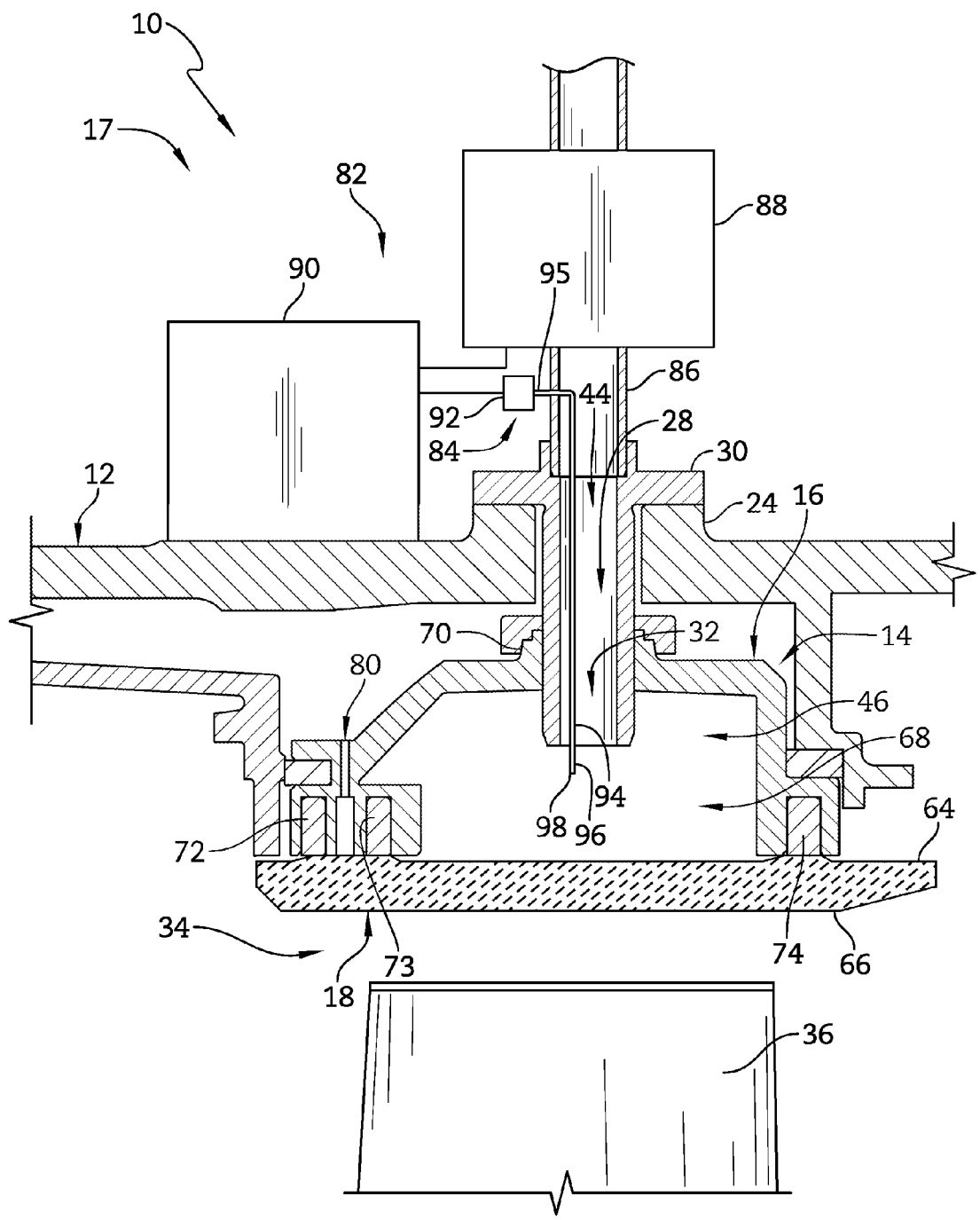
FIG. 7 is a partial cross-sectional view of the gas turbine engine of FIG. 1 showing that the outer insert pins extend through the turbine case into the outer pin receivers formed in the carrier and that the carrier is formed to include the high-pressure air passageway at a forward section of the carrier.
Figure 7A:
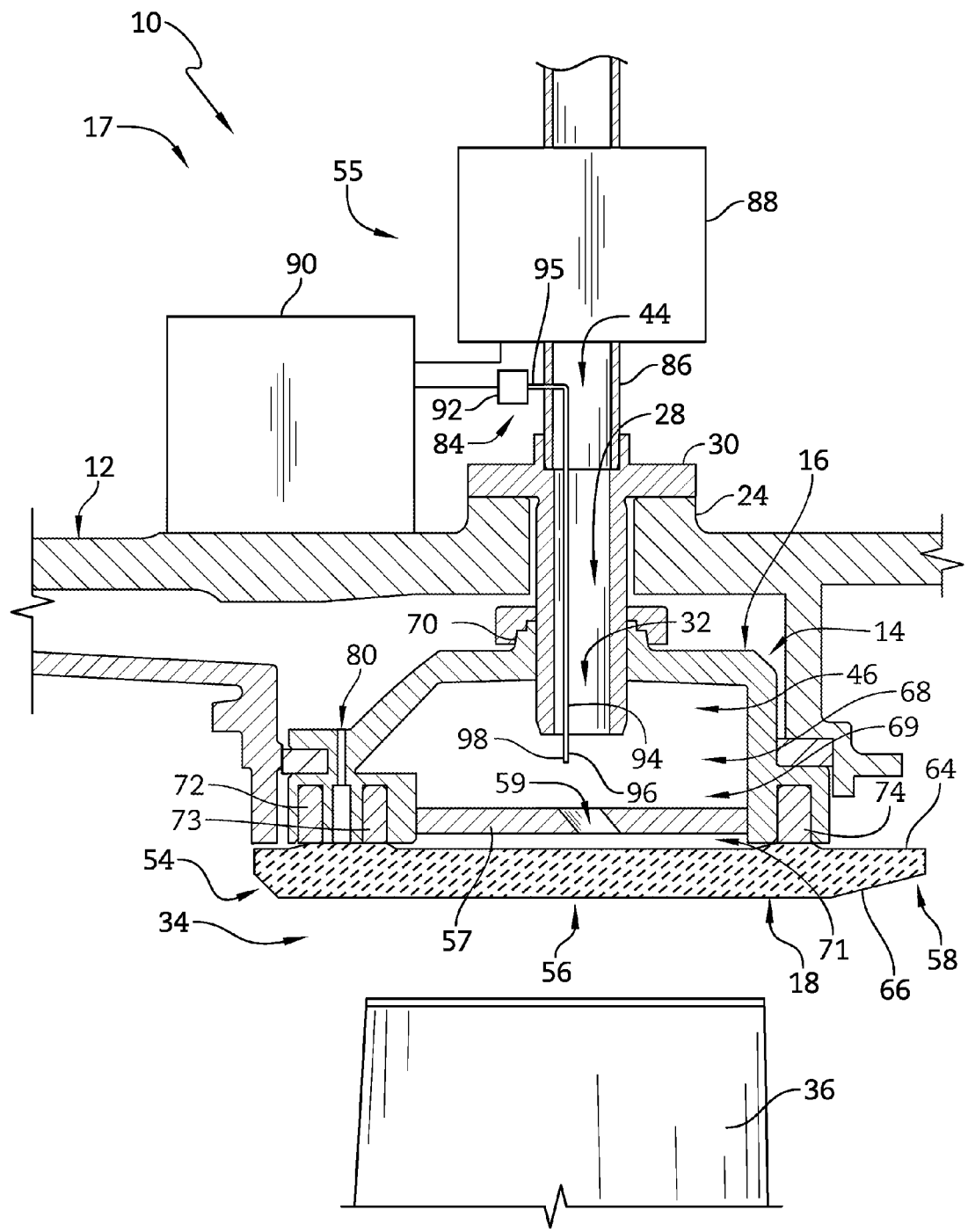
FIG. 7A is a view similar to FIG. 7 showing an optional impingement plate positioned in the turbine shroud and showing that the impingement plate is formed to include diffusion holes configured to distribute cooling air within the turbine shroud.

An illustrative gas turbine engine 10 includes a turbo shaft 11, a compressor 13, a combustor 15, and a turbine 17 as shown in FIG. 1. The turbine 17 includes a turbine case 12 arranged to support a turbine shroud 14 between blades 33 included in the turbine 17 and the turbine case 12 as shown in FIG. 2. The turbine shroud 14 includes a carrier 16 and a runner 18 coupled to the carrier 16 as shown in FIGS. 3 and 4. In some embodiments, the turbine 17 includes two sets of mount pins 30, 50 to locate the runner 18 of the turbine shroud 14; specifically, outer insert pins 30 are arranged to couple the turbine shroud 14 to the turbine case 12 and inner insert pins 50 are arranged to couple the runner 18 to the carrier 16 as shown in FIG. 4. In some embodiments, the turbine 17 includes a health monitoring system 82 configured to detect and react to changes in the condition of the turbine shroud 14 as shown in FIG. 7. In some embodiments, an optional impingement plate 57 is arranged radially between the carrier 16 and the runner 18 of the turbine shroud 14 to distribute cooling air within the turbine shroud 14 onto the runner 18 as shown in FIG. 7A.

FIG. 1 shows the illustrative aerospace gas turbine engine 10 used in an aircraft. The turbo shaft 11 included in the engine 10 powers a gearbox that transfers power to a propeller or transfers power directly to a fan, either of which propels the aircraft. The compressor 13 compresses and delivers air to the combustor 15. The combustor 15 mixes fuel with the compressed air received from the compressor 13 and ignites the fuel. The hot, high pressure products of the combustion reaction in the combustor 15 are directed into the turbine 17 and the turbine 17 extracts work from the high pressure products to drive the compressor 13 and the turbo shaft 11. In other embodiments, the engine 10 includes a one or more of a turbofan, turboshaft, turboprop, or other suitable alternative.

As shown in FIG. 2, the turbine 17 includes turbine vane assemblies 26 having a plurality of vanes 36, turbine wheel assemblies 21, 22 having a plurality of blades 31, 33, the turbine shroud 14 arranged around the vanes 36 and the blades 33, and the turbine case 12 arranged around the turbine shroud 14. In the illustrative embodiment, a plurality of turbine shrouds 14 are arranged around the turbine wheel assemblies 21, 22 and the turbine case 12 is arranged around the turbine wheels 21, 22 and the turbine shrouds 14.

The vanes 36 of the vane assemblies 26 extend across a flow path 34 of the hot, high-pressure combustion products from the combustor 15 to direct the combustion products toward the blades 33 of the turbine wheel assemblies 22. The blades 33 are in turn pushed by the combustion products to cause the turbine wheel assemblies 22 to rotate; thereby, driving the rotating components of the compressor 13 and the turbo shaft 11. The exemplary turbine shroud 14, shown in FIG. 2, extends around the turbine wheel assembly 22 and is sized to block most combustion products from passing over the blades 33 without pushing the blades 33 to rotate. Combustion products that are allowed to pass over the blades 33 do not push the blades 33 and such passed-over products contribute to lost performance within the engine 10.

The turbine case 12 extends circumferentially about a central axis 20 of the gas turbine engine 10 as shown in FIG. 1. In the illustrative embodiment, the turbine case 12 is metallic. The turbine case 12 is formed to include a plurality of outer keyways 28 that extend through the turbine case 12 as shown in FIGS. 3, 4, and 7. The outer keyways 28 are arranged to receive the outer insert pins 30 that extend through the outer keyways 28 and into the turbine shroud 14 to couple the turbine shroud 14 to the turbine case 12 as shown in FIG. 3. In other embodiments, the turbine case 12 does not include the outer keyways 28 and the turbine shroud 14 is coupled to the turbine case with hangers, fasteners, or any other suitable alternative coupler.

In the illustrative embodiment, the outer keyways 28 extend radially through the turbine case 12 as shown in FIG. 7. In some embodiments, the turbine case 12 includes at least three outer keyways 28 and outer insert pins 30 to locate the turbine shroud 14 in three dimensions relative to the turbine case 12. Illustratively, the outer keyways 28 are spaced apart from each other circumferentially about the central axis 20 as shown in FIG. 4.

In the illustrative embodiment, the turbine case 12 is formed to include a plurality of bosses 24 as shown in FIG. 7. The bosses 24 are integrally formed with the turbine case 12 and extend radially outward away from the turbine shroud 14. The outer keyways 28 extend through the bosses 24 and the outer insert pins 30 are arranged to extend through the bosses 24.

Figure 8:
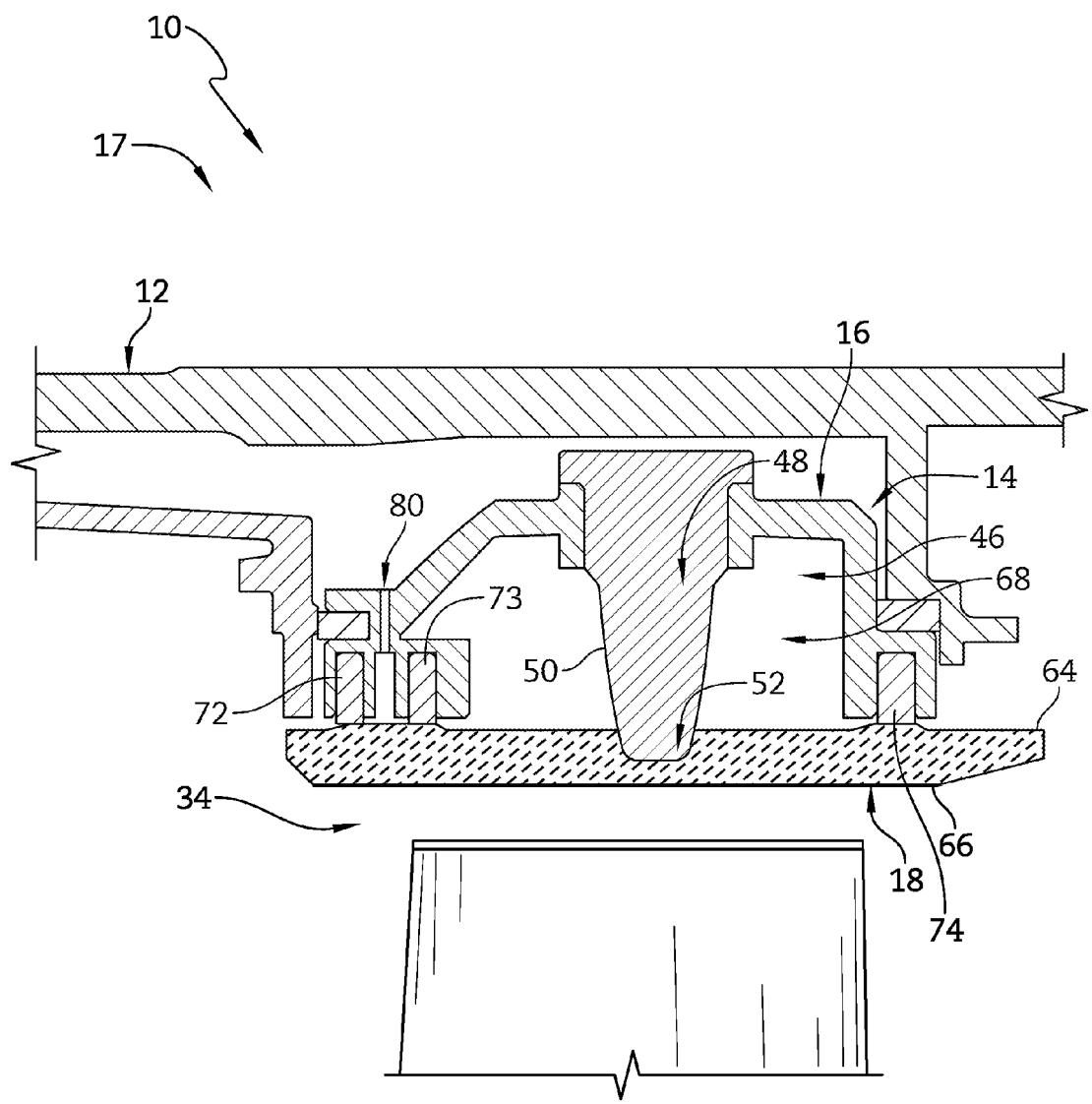
FIG. 8 is a partial cross-sectional view of the gas turbine engine of FIG. 1 showing that the inner insert pins extend through the inner keyways formed in the carrier into the inner pin receivers formed in the annular runner to block rotation of the carrier relative to the annular runner and center the annular runner relative to the carrier.

The turbine shroud 14 extends circumferentially about the central axis 20 as shown in FIGS. 1 and 2. The turbine shroud 14 includes the carrier 16 and the runner 18 (sometimes called a blade track) as shown in FIGS. 3-8. The illustrative carrier 16 is a one-piece annular, round metallic component and is configured to support the runner 18 in position adjacent the blades 33 of the turbine wheel assembly 22. While the carrier 16 is illustrated as an annular (full hoop) component, it may be made up of a number of segments in other embodiments. The illustrative runner 18 is an annular (full hoop) and round component. The illustrative runner 18 is concentric with and nested into the carrier 16 along the central axis 20. The runner 18 is arranged around the blades 33 that rotate about the central axis 20 during operation of the gas turbine engine 10 and the runner 18 is blocked from rotating about the central axis 20 relative to the carrier 16 by insert pins 50 that couple the runner 18 with the carrier 16 as shown in FIG. 8.

The annular runner 18 is illustratively made from a ceramic material; and, more particularly, a ceramic matrix composite (CMC) including silicon carbide fibers and silicon carbide matrix. For purposes of this application, a ceramic material is any monolithic ceramic or composite in which at least one constituent is a ceramic. In other embodiments, the annular runner 18 may be made of other metallic, non-metallic, or composite materials with low coefficients of thermal expansion.

The annular runner 18 is illustratively a unitary component forming a full hoop as shown in FIG. 4. The annular runner 18 is a component of one-piece, continuous construction, rather than as a series of joined segments. This integral construction eliminates gaps that may be formed between parts of a multi-piece (or segmented) runner. The one-piece full hoop of the annular runner 18 encourages uniform radial expansion of the annular runner 18 at high temperatures. Uniform radial expansion of the annular runner 18 allows the annular runner 18 to remain round at high temperatures which results in the ability to further maintain a small gap between the blades 33 and the annular runner 18 while hot combustion products are being directed over the blades 33 and the annular runner 18.

Figure 5:
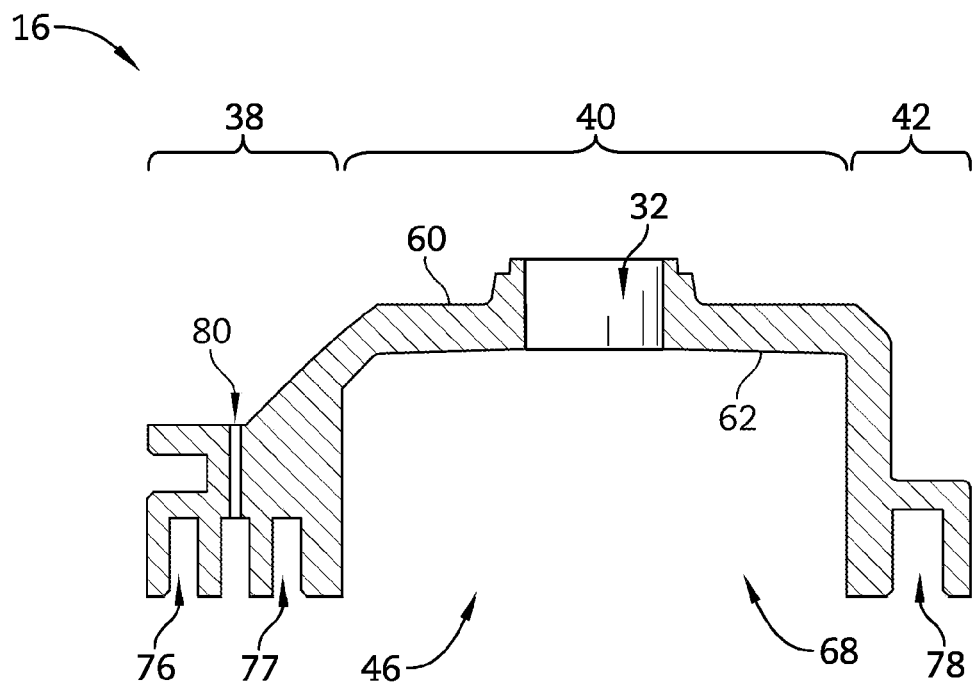
FIG. 5 is a cross-sectional view of the carrier included in the turbine shroud of FIG. 3 showing that the carrier includes a forward section, an aft section, and a midsection extending axially therebetween, showing that the outer pin receivers and the outer keyways are formed in the midsection of the annular runner, and showing that a high-pressure cooling air passage is formed in the forward section of the carrier.

In illustrative embodiments, the carrier 16 is formed to include a plurality of outer pin receivers 32 arranged to receive the outer insert pins 30 as shown in FIGS. 5 and 7. The outer insert pins 30 extend through the turbine case 12 and into the outer pin receivers 32 formed in the carrier 16 to block rotation of the turbine shroud 14 about the central axis 20 relative to the turbine case 12. The outer insert pins 30 may also block axial movement of the turbine shroud 14 along the central axis 20 relative to the turbine case 12. In some embodiments, the turbine shroud 14 does not include outer insert pins 30. In such embodiments, the turbine shroud 14 may include at least one outer pin receiver 32 (sometimes called a vent hole or a carrier aperture) arranged to receive a sensor 84.

The carrier 16 is formed to include an inwardly-opening carrier channel 46 as shown in FIGS. 3, 5, and 7. The inwardly-opening carrier channel 46 extends circumferentially around the central axis 20. Illustratively, the outer pin receivers 32 extend through the carrier 16 and open into the carrier channel 46.

The carrier 16 includes an outer radial carrier surface 60 and an inner radial carrier surface 62 positioned radially between the central axis 20 and the outer radial carrier surface 60 as shown in FIG. 5. Illustratively, each outer pin receiver 32 extends in a radial direction through the outer radial carrier surface 60 and the inner radial carrier surface 62 and opens into the inwardly-opening carrier channel 46. In other embodiments, some or all of the outer pin receivers 32 extend in a radial direction partway through the carrier 16 from the outer radial carrier surface 60 toward the inner radial carrier surface 62 of the carrier 16.

The carrier 16 includes a forward section 38, an aft section 42 spaced apart axially from the forward section 38 relative to the central axis 20, and a midsection 40 positioned axially between the forward section 38 and the aft section 42 as shown in FIG. 5. In the illustrative embodiment, the outer pin receivers 32 are formed in the midsection 40 of the carrier 16 as shown in FIG. 5. The outer keyways 28 formed in the turbine case 12 are arranged to align axially with the outer pin receivers 32 as shown in FIG. 7.

In some embodiments, the outer pin receivers 32 are located midway circumferentially between fuel nozzles included in the turbine 17. The fuel nozzles may cause the turbine shroud 14 to have hot zones 45 as shown in FIG. 4. The hot zones 45 may be spaced apart circumferentially about the turbine shroud 14.

In the illustrative embodiment, the carrier 16 is formed to include a plurality of bosses 70 as shown in FIG. 5. The bosses 70 are integrally formed with the carrier 16 and extend radially outward away from the carrier 16. The outer pin receivers 32 extend into the bosses 70 and the outer insert pins 30 extend through the bosses 70.

In the illustrative embodiment, the turbine 17 includes the plurality of outer insert pins 30 as shown in FIGS. 4 and 7. The outer insert pins 30 extend through the outer keyways 28 formed in the turbine case 12 and into the outer pin receivers 32 formed in the carrier 16 to block rotation of the carrier 16 relative to the turbine case 12 to provide centering of the carrier 16 to the turbine case 12 while allowing the carrier 16 and the turbine case 12 to expand and contract at different rates when the turbine shroud 14 is heated and cooled during operation of the engine 10. Accordingly the turbine case 12 and the carrier 16 may be made from different materials that have different coefficients of thermal expansion.

In the illustrative embodiment, one of the outer insert pins 30 is a hollow outer insert pin 30 formed to include a cooling passageway 44 that extends radially through the hollow outer insert pin 30 as shown in FIG. 7. The inwardly-opening carrier channel 46 is exposed to fluid communication with air radially outwardly of the annular runner 18 through the cooling passageway 44 formed in the hollow outer insert pin 30. Illustratively, pressurized cooling air is directed through the hollow outer insert pin 30 through the turbine case 12 and the carrier 16 into the carrier channel 46. In other embodiments, each of the outer insert pins 30 is hollow. As a result, pressurized cooling air may be directed through each of the hollow outer insert pins 30.

Figure 6:
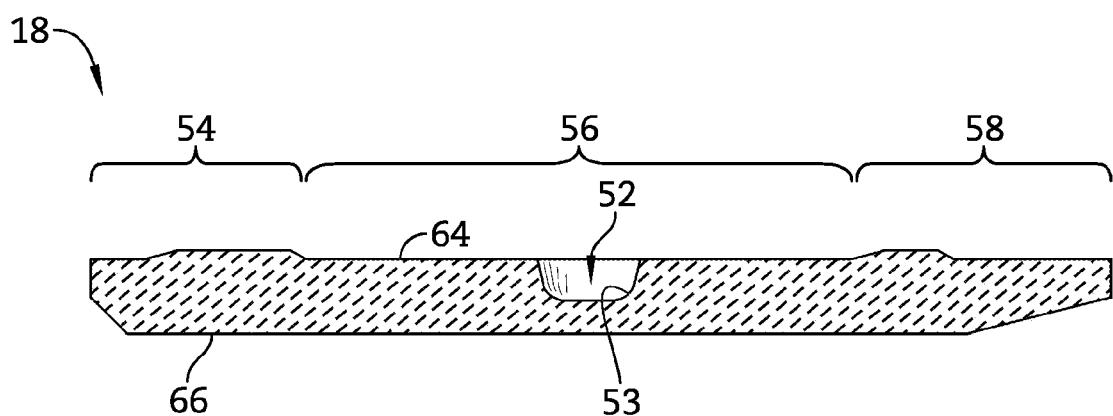
FIG. 6 is a cross-sectional view of the annular runner included in the turbine shroud of FIG. 3 showing that the annular runner includes a forward section, an aft section, and a midsection extending axially therebetween.

The annular runner 18 is aligned with the inwardly-opening carrier channel 46 and is positioned close to the carrier 16 to define a buffer chamber 68 defined between by the annular runner 18 and the carrier 16 as shown in FIGS. 3, 7, and 8. In the illustrative embodiment, the annular runner 18 is formed to include a plurality of inner pin receivers 52 as shown in FIGS. 6 and 8. The plurality of inner pin receivers 52 are spaced apart circumferentially about the central axis 20 and sized to receive a plurality of inner insert pins 50 as suggested in FIG. 4. Illustratively, the inner pin receivers 52 are spaced apart from the outer pin receivers 32 so that the inner pin receivers 52 are circumferentially offset from the outer pin receivers 32.

The annular runner 18 includes an outer radial runner surface 64 and an inner radial runner surface 66 positioned radially between the central axis 20 and the outer radial runner surface 64 as shown in FIG. 6. The illustrative inner pin receivers 52 extend in a radial direction partway through the annular runner 18 from the outer radial runner surface 64 toward the inner radial runner surface 66 of the annular runner 18 as shown in FIGS. 6 and 8.

The annular runner 18 includes a forward section 54, an aft section 58 spaced apart axially from the forward section 54 relative to the central axis 20, and a midsection 56 positioned axially between the forward section 54 and the aft section 58 as shown in FIG. 6. In some embodiments, the inner pin receivers 52 are located midway circumferentially between the hot zones 45 caused by fuel nozzles included in the turbine 17. Illustratively, the pressurized cooling air is supplied to the inwardly-opening carrier channel 46 to cool an outer radial runner surface 64 of the annular runner 18.

In other embodiments, the annular runner 18 includes a plurality of bosses formed to include a corresponding pin receiver 52. The bosses extend outward radially away from the outer radial runner surface 64 of the annular runner 18 into the inwardly-opening carrier channel 46. In some embodiments, the bosses are located in the midsection 56 of the annular runner 18.

In the illustrative embodiment, the turbine 17 includes the plurality of inner insert pins 50 as shown in FIGS. 4 and 8. The inner insert pins 50 extend through the inner keyways 48 formed in the carrier 16 and into the inner pin receivers 52 formed in the annular runner 18 to block rotation of the annular runner 18 relative to the carrier 16 to provide centering of the annular runner 18 to the carrier 16 while allowing the annular runner 18 and the carrier 16 to expand and contract at different rates when the turbine shroud 14 is heated and cooled during operation of the engine 10. Accordingly the carrier 16 and the annular runner 18 may be made from different materials that have different coefficients of thermal expansion. In some embodiments, the gas turbine engine 10 includes at least three inner insert pins 50 to locate the runner 18 in three dimensions relative to the carrier 16.

According to at least one method of assembling the gas turbine engine 10, the annular runner 18 is rotated to predetermined orientation relative to the carrier 16 so that the inner pin receivers 52 formed in the annular runner 18 are aligned with corresponding inner keyways 48 formed in the carrier. The annular runner 18 is nested into the carrier 16 so that the annular runner 18 is concentric with the carrier 16. The inner insert pins 50 are placed into the corresponding inner keyways 48 and inner pin receivers 52 to establish a connection between the annular runner 18 and the carrier 16 and to provide the turbine shroud 14.

According to a method of assembling the gas turbine engine 10, the turbine shroud 14 is rotated to a predetermined orientation relative to the turbine case 12 so that the outer pin receivers 32 formed in the carrier 16 are aligned with the corresponding outer keyways 28 formed in the turbine case 12. The turbine shroud 14 is nested into the turbine case 12 so that the turbine shroud 14 is concentric with the turbine case 12. The outer insert pins 30 are placed into the corresponding outer keyways 28 and the outer pin receivers 32 to establish a connection between the turbine case 12 and the turbine shroud 14.

In the illustrative embodiments, the outer keyways 28, the outer pin receivers 32, and the outer insert pins 30 are unthreaded as shown in FIGS. 5 and 7. In other embodiments, the outer keyways 28, the outer pin receivers 32, and the outer insert pins 30 are threaded. In some embodiment, the outer pin receivers 32 include chamfered surfaces.

In the illustrative embodiments, the inner keyways 48, the inner pin receivers 52, and the inner insert pins 50 are unthreaded as shown in FIGS. 6 and 8. In other embodiments, the inner keyways 48, the inner pin receivers 52, and the inner insert pins 50 are threaded. In some embodiment, the inner pin receivers 52 include chamfered surfaces 53 as shown in FIG. 6. The inner insert pins 50 may block axial movement of the annular runner 18 along the central axis 20 relative to the carrier 16.

In the illustrative embodiment, the outer pin receivers 32 have a larger diameter than a diameter of the outer insert pins 30. In other embodiments, the outer pin receivers 32 comprise slots. In some embodiments, the slotted outer pin receivers 32 have a larger axial dimension than a circumferential dimension relative to the central axis 20. In some embodiments, the slotted outer pin receivers 32 extend from the midsection 40 partway into one or both of the forward section 38 and the aft section 42.

In the illustrative embodiment, the inner pin receivers 52 have a larger diameter than a diameter of the inner insert pins 50. In other embodiments, the inner pin receivers 52 comprise slots. In some embodiments, the slotted inner pin receivers 52 have a larger axial dimension than a circumferential dimension relative to the central axis 20. In some embodiments, the slotted pin receivers 52 extend from the midsection 56 partway into one or both of the forward section 54 and the aft section 58.

The cooling system 55 may include an optional annular impingement plate 57 positioned in the buffer chamber 68 to separate the buffer chamber 68 into an outer chamber 69 and an inner chamber 71 as shown in FIG. 7A. The inner chamber 71 is located radially between the outer chamber 69 and the annular runner 18. At least one of the outer pin receivers 32 opens into the outer chamber 69 to direct the pressurized cooling air into the outer chamber 69. In the illustrative embodiment, pressurized cooling air is directed through the hollow outer insert pin 30 and into the outer chamber 69.

The illustrative impingement plate 57 includes a plurality of diffusion holes 59 that extend through the impingement plate 57 as shown in FIG. 7A. The diffusion holes 59 are arranged to direct the pressurized cooling air in the outer chamber 69 through the impingement plate 57 into the inner chamber 71 and toward the outer radial runner surface 64 of the annular runner 18. Illustratively, the diffusion holes 59 are spaced circumferentially around the impingement plate 57. In some embodiments, the diffusion holes 59 are formed to direct the pressurized cooling air toward corresponding hot zones 45 of the annular runner 18.

The carrier 16 is formed to include a high-pressure cooling passage 80 that extends through the carrier 16 as shown in FIG. 7A. The high-pressure cooling passage 80 is configured to direct high-pressure air toward the forward section 38 of the annular runner 18. The high-pressure air has a greater pressure than the pressurized cooling air. As a result, the forward section 38 of the annular runner 18 is cooled. In the illustrative embodiment, the diffusion holes 59 are formed to direct the pressurized cooling air toward at least one of the aft section 44 and the midsection 42 of the annular runner 18 as shown in FIG. 7A.

In the illustrative embodiment, the cooling system 55 further includes the controller 90 and a valve 88 as shown in FIG. 7A. The controller 90 is configured to modulate a flow rate of the pressurized cooling air directed through the valve 88 into the outer chamber 69 to cause the runner 18 to expand and contract to control a radius of the runner 18.

According to at least one method of assembling a gas turbine engine having a cooling system, the impingement plate 57 is positioned in the radially inwardly-opening carrier channel 46 formed in the carrier 16 to define the outer chamber 69. The runner 18 is coupled with the carrier 16 to form the turbine shroud 14 and to close the carrier channel 46 to define the inner chamber 71 located radially between the outer chamber 69 and the runner 18. The turbine shroud 14 is coupled to the turbine case 12 included in the gas turbine engine 10. The hollow outer insert pin 30 is inserted through the turbine case 12 and the carrier 16 into the outer chamber 69 to provide the cooling passageway 44 through the turbine case 12 and the carrier 16 into the outer chamber 69.

In the illustrative embodiment, the gas turbine engine 10 includes a health monitoring system 82 as shown in FIGS. 3 and 7. The health monitoring system 82 includes at least one sensor 84. In some turbine shrouds, the air in the buffer chamber may be distributed unevenly. As one example, turbine shrouds including segmented runners may allow the pressurized cooling air to leak between the runner segments which may cause uneven distribution of the air in the buffer chamber. As a result, it may be difficult for sensors to reliably measure properties of the air within internal chambers within segments.

The illustrative annular runner 18 is configured to result in generally uniform distribution of the air in the buffer chamber 68. In the illustrative example, the annular runner 18 reduces air leakage by eliminating leakage between segments as the runner 18 is a one-piece annular runner 18 without segments. Due to the generally uniformly distributed air in the buffer chamber 68, a single sensor (or a small number of sensors), such as pressure sensor 84, may be used to reliably measure properties of the air in the buffer chamber 68. The illustrative health monitoring 82 system includes the pressure sensor 84 arranged to measure an air pressure in the buffer chamber 68.

During operation of the gas turbine engine 10, the hot combustion products in the flow path 34 of the turbine 17 may damage and/or burn through a portion of the annular runner 18. As a result, unintentional fluid communication is provided between the combustion products in the flow path 34 and the buffer chamber 68. The unintentional fluid communication causes a change in pressure in the buffer chamber 68 that is detectable by the pressure sensor 84.

The pressure sensor 84 is located to monitor for changes in the pressure in the buffer chamber 68 which indicate that the annular runner 18 has been compromised as suggested in FIG. 7. Illustratively, the pressure sensor 84 is arranged to monitor for changes which indicate that unintentional fluid communication has been provided between the buffer chamber 68 and the flow path 34.

Illustratively, the health monitoring system 82 may be configured to alert an operator or engine control system of the gas turbine engine 10 that the annular runner 18 is damaged based on information from the pressure sensor 84 so that the operator or engine control system may respond accordingly. For example, the operator or the engine control system may direct additional cooling air to the annular runner 18, reduce a power of the engine 10, shut down the engine 10, schedule inspection and repair of the engine 10.

In the illustrative embodiment, the pressure sensor 84 includes a transducer 92 and a pressure tube 94 as shown in FIG. 7. The pressure tube includes a first end 95 coupled to the transducer 92 and a second end 96 in fluid communication with the buffer chamber 68. In some embodiments, the transducer 92 is located outside of the buffer chamber 68 and the second end 96 of the pressure tube 94 extends into one of the outer pin receivers 32 and opens into the buffer chamber 68. In the illustrative embodiment, the transducer 92 is coupled to the turbine case 12 and the pressure tube extends through the hollow outer insert pin 30. In the illustrative embodiment, the pressure tube 94 extends into the buffer chamber 68. In other embodiments, the pressure tube 94 opens into the buffer chamber 68 without extending into the buffer chamber 68.

In the illustrate embodiment, the health monitoring system 82 further includes a conduit 86, the valve 88, and the controller 90 as shown in FIGS. 3 and 7. The conduit 86 is in fluid communication with the buffer chamber 68 to direct pressurized cooling air through the turbine case 12 and the carrier 16 into the buffer chamber 68. The valve 88 is connected to the conduit 86. The controller 90 is coupled to the valve 88 to open and close the valve 88 in response to signals received from the pressure sensor 84 to modulate the pressurized cooling air directed into the buffer chamber 68.

In the illustrative embodiment, the conduit 86 is coupled to a hollow outer insert pin 30 as shown in FIG. 7. In other embodiments, the conduit 86 extends through one of the outer keyways 28 formed in the turbine case 12 and opens into the buffer chamber 68 to direct pressurized cooling air through the turbine case 12 and the carrier 16 into the buffer chamber 68. In the illustrative embodiment, the controller 90 and the valve 88 are positioned radially outside the turbine case 12 to locate the turbine case 12 between the controller 90 and the central axis 20.

In the illustrative embodiment, the compressor 13 supplies the pressurized cooling air to the conduit 86. In the illustrative embodiment, interstage compressor air, sometimes called intermediate stage air, is supplied to the conduit 86 by the compressor 13. In some embodiments, compressor discharge air having a higher pressure than the interstage compressor air is supplied to the conduit 86 by the compressor. Illustratively, interstage compressor air is drawn from an intermediate stage of the compressor 13 and the compressor discharge air is drawn from a compressor stage downstream of the intermediate stage. Illustratively, the compressor discharge air is drawn from the last stage of the compressor 13.

The controller 90 is configured to actively adjust the valve 88 during operation of the engine 10. As one example, the controller 90 is arranged to actively adjust the valve 88 between the opened and closed position to regulate a flow of the pressurized cooling air. As another example, the controller 90 is arranged to fully open and fully close the valve 88 to regulate a flow of the pressurized cooling air. In some embodiments, the health monitoring system 82 includes a high speed controller and a high speed valve 88.

In some embodiments, the controller 90 is configured to fully close the valve 88 in response to the signals received from the pressure sensor 84 being indicative of the air pressure in the buffer chamber 68 being below a predetermined threshold pressure. As an example, high pressure air, such as compressor discharge air, having a higher pressure than the pressurized cooling air is directed toward the forward section 38 of the annular runner 18 through a high-pressure cooling passage 80 in some embodiments. If the annular runner 18 is compromised, the high pressure air may be used to purge the buffer chamber 68 and the valve 88 may be closed to block the high pressure air and the combustion products from flowing through the conduit 86 toward the compressor 13.

In some embodiments, the controller 90 is configured to fully open the valve 88 in response to the signals received from the pressure sensor 84 being indicative of the air pressure in the buffer chamber 68 being below a predetermined threshold pressure. As an example, high pressure air, such as compressor discharge air, having a relative high pressure is directed through the conduit 86 toward the annular runner 18 in some embodiments. If the annular runner 18 is compromised, the valve 88 may be fully opened to allow the high pressure pressurized cooling air to purge the buffer chamber 68.

In some embodiments, the health monitoring system further includes a temperature sensor 98 as shown in FIG. 7. The temperature sensor 98 is configured to measure a temperature in the buffer chamber 68. The controller 90 is configured to receive signals from the temperature sensor 98 and to open and close the valve 88 in response to the signals received from the temperature sensor 98 to modulate the pressurized cooling air directed into the buffer chamber 68.

According to at least one method of controlling the health monitoring system 82, pressurized cooling air is directed into the buffer chamber 68 formed between the carrier 16 and the annular runner 18. The buffer chamber 68 is configured to route the pressurized cooling air around the annular runner 18. The air pressure in the buffer chamber 68 is measured. The pressurized cooling air directed into the buffer chamber 68 is controlled in response to the air pressure measurements.

In the illustrative embodiment, the turbine shroud 14 further includes a first forward seal 72, a second forward seal 73, and an aft seal 74 as shown in FIGS. 3, 7, and 9-13. The seals 72, 73, 74 are positioned between the carrier 16 and the annular runner 18 to block combustion products from flowing out of the flow path 34 and over the outer radial runner surface 64 of the annular runner 18. The seals 72, 73, 74 are arranged to maintain contact with the annular runner 18 as the carrier 16 and annular runner 18 move radially due to thermal expansion. In some embodiments, the seals 72, 73, 74 are pre-loaded into a compressed state.

In an illustrative embodiment, the carrier 16 is formed to include a first inwardly-facing forward seal receiver 76, a second inwardly-facing forward seal receiver 77, and an inwardly-facing aft seal receiver 78 as shown in FIGS. 5 and 7. The first and second forward seal receivers 76, 77 are axially aligned with the forward section 54 of the annular runner 18 and receive corresponding seals 72, 73. The aft seal receiver 78 is aligned with the aft section 58 of the annular runner 18 and receives seal 74. The annular runner 18 is located radially inward of the forward and aft seal receivers 76, 77, 78 and engage the seals 72, 73, 74.

In illustrative embodiments, the carrier 16 is formed to include the high-pressure cooling passage 80 as shown in FIGS. 5 and 7. The high-pressure cooling passage 80 is arranged to receive high pressure cooling air and to direct the high pressure cooling air toward the annular runner 18. The high-pressure air has a greater pressure than the pressurized cooling air directed through the inner pin receivers 52.

Illustratively, the high-pressure cooling passage 80 is formed in the forward section 38 of the carrier 16 and directs the high pressure cooling air toward the forward section 54 of the outer radial runner surface 64 of the annular runner 18 as shown in FIGS. 5 and 7. In the illustrative embodiment, the first forward seal 72 is spaced apart axially from the second forward seal 73 to locate the high-pressure cooling passage between the first and second forward seals 72, 73. The aft seal 74 is spaced apart axially from the second forward seal 73 to locate the buffer chamber 68 therebetween.

A portion of the high-pressure cooling air blocks combustion products in the flow path 34 from passing between the annular runner 18 and the carrier 16 at the forward end of the turbine shroud 14 as suggested in FIG. 7. A portion of the high-pressure cooling air is directed aft into the buffer chamber 68. The high-pressure cooling air in the buffer chamber 68 may exit the buffer chamber 68 at the aft end of the carrier 16 and annular runner 18 and block combustion products in the flow path 34 from passing between the annular runner 18 and the carrier 16 at the aft end of the turbine shroud 14.

Figure 12:
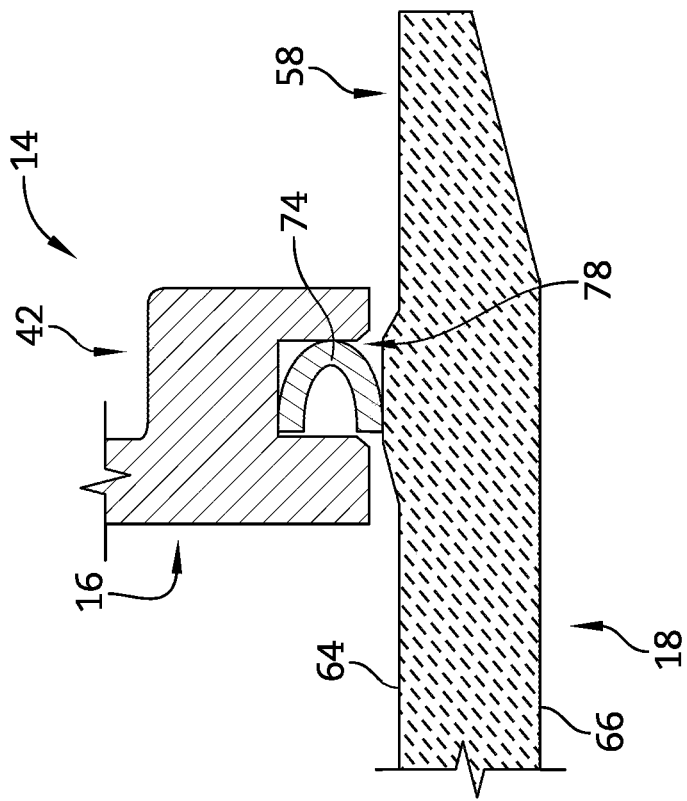
FIG. 12 is an enlarged cross-sectional view of the turbine shroud of FIGS. 7 and 8 showing an alternative C-shaped seal positioned between the aft sections of the carrier and the annular runner in place of the piston ring seal of FIG. 10.
Figure 11:
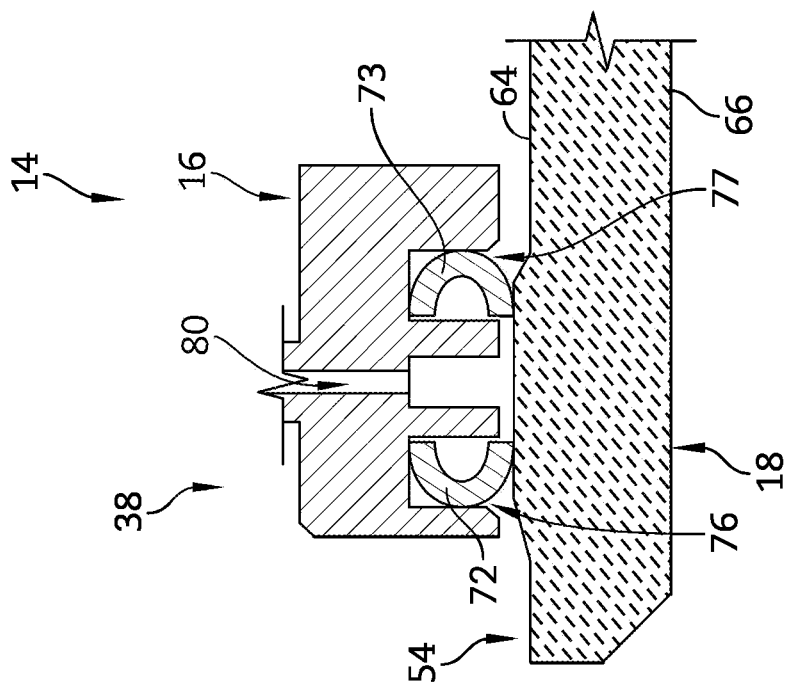
FIG. 11 is an enlarged cross-sectional view of the turbine shroud of FIGS. 7 and 8 showing alternative C-shaped seals positioned between the forward sections of the carrier and the annular runner in place of the piston ring seals of FIG. 9.

In illustrative embodiments, the seals 72, 73, 74 are piston ring seals as shown in FIG. 7. In some embodiments, the piston ring seals 72, 73, 74 comprise ceramic matrix composite material. In other embodiments, the seals 72, 73, 74 comprise O-rings 72, 73, 74 in place of the piston ring seals. In some embodiments, the seals 72, 73, 74 are C-shaped seals and replace the piston ring seals as shown in FIGS. 11 and 12. In some embodiments, one or more of the seals 72, 73, 74 are W-shaped and replace the piston ring seals as shown in FIG. 13. As shown in FIG. 13, in some embodiments, the carrier 16 includes one forward seal receiver 76 and the W-shaped seal 72 is positioned in the forward seal receiver 76. In some embodiments, each seal 72, 73, 74 is a full hoop. In other embodiments, each seal 72, 73, 74 is formed from a number of seal sections. In some embodiments, the seals 72, 73, 74 comprise ceramic matrix composite material. In some embodiments, the seals 72, 73, 74 are formed to include through holes to allow a predetermined flow of air through the seals 72, 73, 74.

This application cross-references U.S. Patent Application Publication Number 2017/0204736 titled GAS TURBINE ENGINE WITH HEALTH MONITORING SYSTEM which published on Jul. 20, 2017, filed concurrently herewith and U.S. Patent Application Publication Number 2017/0204744 titled TURBINE SHROUD WITH MOUNTED FULL HOOP BLADE TRACK which published on Jul. 20, 2017, filed concurrently herewith, the disclosures of which are now expressly incorporated herein by reference. The subject matter disclosed in those references, including the claimed subject matter, is included herein such that the present disclosure includes each of the features and combinations thereof.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud for use in a gas turbine engine having a central axis, the turbine shroud comprising
an annular carrier formed to define a radially inwardly-opening carrier channel that extends around the central axis and the annular carrier includes an outer pin receiver that extends through the annular carrier and opens into the carrier channel to allow pressurized cooling air to pass through the annular carrier into the carrier channel and a high-pressure cooling air passageway that extends radially through the annular carrier, a one-piece annular runner aligned axially with the carrier channel of the annular carrier, the one-piece annular runner includes an inner radial runner surface located radially between the annular carrier and the central axis and an outer radial runner surface located radially between the inner radial runner surface and the annular carrier, and the outer radial runner surface cooperates with the annular carrier to form an annular buffer chamber between the annular carrier and the one-piece annular runner, and a cooling system including an annular impingement plate positioned in the annular buffer chamber to separate the annular buffer chamber into an outer chamber and an inner chamber located radially between the outer chamber and the one-piece annular runner, the outer pin receiver opens into the outer chamber to direct the pressurized cooling air into the outer chamber, and the annular impingement plate includes a plurality of diffusion holes spaced circumferentially around the annular impingement plate and each diffusion hole extends radially through the impingement plate to direct the pressurized cooling air in the outer chamber through the annular impingement plate into the inner chamber and toward the outer radial runner surface of the one-piece annular runner, wherein the one-piece annular runner includes a forward section, an aft section spaced apart axially from the forward section, and a midsection extending between the forward section and the aft section, the high-pressure cooling air passageway is configured to direct high-pressure air toward the forward section of the one-piece annular runner, the high-pressure air has a greater pressure than the pressurized cooling air, and the turbine shroud further includes a first seal positioned radially between the one-piece annular runner and the annular carrier and positioned axially between the high-pressure cooling air passageway and the annular buffer chamber.

2. The turbine shroud of claim 1, wherein the one-piece annular runner includes circumferentially spaced apart hot zones associated with relatively high temperatures during operation of the gas turbine engine and each diffusion hole formed in the annular impingement plate is arranged to direct the pressurized cooling air toward a corresponding hot zone.

3. The turbine shroud of claim 1, wherein the diffusion holes formed in the annular impingement plate are arranged to direct the pressurized cooling air toward at least one of the aft section and the midsection.

4. The turbine shroud of claim 1, wherein the gas turbine engine includes a turbine case arranged around the annular carrier, the cooling system further includes a hollow insert pin configured to extend through the turbine case and the outer pin receiver formed in the annular carrier to couple the annular carrier to the turbine case, and the hollow insert pin is configured to direct the pressurized cooling air through the turbine case and the annular carrier into the outer chamber.

5. The turbine shroud of claim 4, wherein the cooling system further includes a controller configured to modulate a flow rate of the pressurized cooling air directed through the hollow insert pin into the outer chamber to control an expansion and contraction of the one-piece annular runner.

6. The turbine shroud of claim 4, further including a second seal positioned between the outer radial runner surface of the one-piece annular runner and the annular carrier to block the pressurized cooling air from escaping the inner chamber and the second seal is positioned axially aft of the first seal to locate the annular buffer chamber axially between the first seal and the second seal.

7. The turbine shroud of claim 6, wherein the second seal includes a piston ring made from one of a metallic material, a ceramic material, and a ceramic matrix composite material.

8. A gas turbine engine comprising
a turbine case arranged around a central axis of the gas turbine engine, the turbine case includes one or more outer keyways that extend through the turbine case,
a turbine shroud including (i) a carrier formed to define a radially inwardly-opening carrier channel that extends around the central axis and one or more outer pin receivers that extend through the carrier and open into the carrier channel and (ii) an annular runner aligned axially with the carrier and positioned to close the inwardly-opening carrier channel to form an annular buffer chamber between the carrier and the annular runner, and
a cooling system including one or more hollow outer insert pins that extend through the corresponding one or more outer keyways formed in the turbine case and the one or more outer pin receivers formed in the carrier into the buffer chamber to allow pressurized cooling air to pass through the turbine case and the carrier into the buffer chamber,
wherein the annular runner includes a forward section, an aft section spaced apart axially from the forward section, and a midsection extending between the forward section and the aft section, the carrier is formed to include a high-pressure cooling air passageway that extends through the carrier and is configured to direct high-pressure air toward the forward section of the annular runner, and the high-pressure air has a greater pressure than the pressurized cooling air,
wherein the gas turbine engine further includes a first seal positioned radially between the annular runner and the carrier and positioned axially between the high-pressure cooling air passageway and the buffer chamber.

9. The gas turbine engine of claim 8, further including a second seal positioned radially between the annular runner and the carrier and positioned axially aft of the first seal to locate the buffer chamber axially between the first and the second seal and each of the first seal and the second seal includes a piston ring made from one of a ceramic and a ceramic matrix composite material.

10. The gas turbine engine of claim 8, wherein the cooling system further includes an impingement plate positioned in the annular buffer chamber to separate the annular buffer chamber into an outer chamber and an inner chamber located radially between the outer chamber and the annular runner, the one or more hollow outer insert pins is in fluid communication with the outer chamber to direct the pressurized cooling air into the outer chamber, and the impingement plate includes a plurality of diffusion holes spaced apart circumferentially around the impingement plate that extend radially through the impingement plate to direct the pressurized cooling air in the outer chamber through the impingement plate into the inner chamber and toward the annular runner.

11. The gas turbine engine of claim 10, wherein the annular runner includes circumferentially spaced apart hot zones associated with relatively high temperatures during operation of the gas turbine engine and each diffusion hole is formed to direct the pressurized cooling air toward a corresponding hot zone.

12. The gas turbine engine of claim 10, wherein the plurality of diffusion holes are arranged to direct the pressurized cooling air toward at least one of the aft section and the midsection.

13. The gas turbine engine of claim 10, further comprising a compressor, the pressurized cooling air is supplied by an intermediate stage of the compressor, and the high-pressure air is supplied by a compressor stage located downstream of the intermediate stage.

14. The gas turbine engine of claim 8, further comprising a compressor and the pressurized cooling air is supplied by an intermediate stage of the compressor.

15. The gas turbine engine of claim 8, wherein the cooling system further includes a controller configured to modulate a flow rate of the pressurized cooling air directed through the one or more hollow outer insert pins into the buffer chamber and the controller is coupled to an outer surface of the turbine case.

* * * * *